United States Patent
Rische et al.

(10) Patent No.: US 7,091,280 B2
(45) Date of Patent: Aug. 15, 2006

(54) STABILIZED AQUEOUS POLYURETHANE-POLYUREA DISPERSIONS

(75) Inventors: Thorsten Rische, Unna (DE); Karin Naujoks, Odenthal (DE); Jürgen Meixner, Krefeld (DE); Thomas Feller, Solingen (DE); Eberhard König, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 72 days.

(21) Appl. No.: 10/341,880

(22) Filed: Jan. 14, 2003

(65) Prior Publication Data

US 2003/0194556 A1    Oct. 16, 2003

(30) Foreign Application Priority Data

Jan. 17, 2002    (DE) ................ 102 01 546

(51) Int. Cl.
  *C08J 3/00*    (2006.01)
  *C08K 3/20*    (2006.01)
  *C08K 5/34*    (2006.01)
  *C08L 75/00*   (2006.01)
  *B32B 27/40*   (2006.01)

(52) U.S. Cl. ............... 524/591; 428/375; 428/425.6; 524/99; 524/102; 524/191; 524/589; 524/590; 524/839; 524/840

(58) Field of Classification Search ........... 524/589, 524/590, 591, 839, 840, 99, 102, 191; 428/375, 428/425.6
See application file for complete search history.

(56) References Cited

U.S. PATENT DOCUMENTS

| | | | | |
|---|---|---|---|---|
| 5,216,078 | A | 6/1993 | Cook et al. | 525/124 |
| 5,922,806 | A * | 7/1999 | Blum et al. | 524/591 |
| 5,961,878 | A | 10/1999 | Konig et al. | 252/182.21 |
| 6,242,530 | B1 | 6/2001 | König et al. | 524/718 |

FOREIGN PATENT DOCUMENTS

CA    2253119    5/1999

* cited by examiner

*Primary Examiner*—Patrick D. Niland
(74) *Attorney, Agent, or Firm*—Joseph C. Gil

(57) ABSTRACT

The present invention relates to a binder composition containing
A) at least one aqueous polyurethane-polyurea dispersion and
B) at least one stabilizer containing
  a) at least one amine having a structural unit corresponding to formula (I)

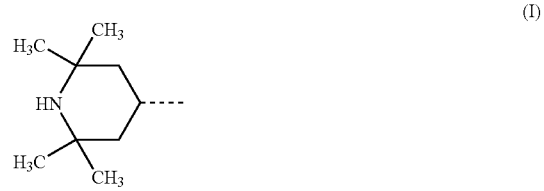

(I)

which has no hydrazide groups,
  b) at least one compound having a structural unit corresponding to formula (II)

—CO—NH—NH—    (II)

and
  c) optionally a stabilizing compound other than a) and b).

The polyurethane dispersions are manufactured in the presence of components a) and b). It is possible for components a) and b), depending on the grade used, to be incorporated into the polymer framework as structural units.

For this reason binder compositions comprising
A) at least one aqueous polyurethane dispersion, containing structural units of at least one stabilizing agent or mixture of stabilizing agents B) based on
  a) at least one amine with the general formula (I),

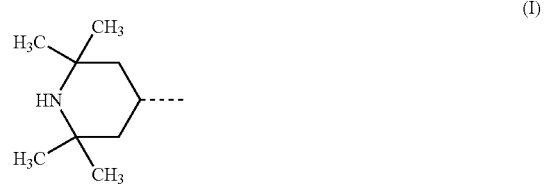

(I)

which has no hydrazide groups,
  b) at least one compound with the general formula (II),

—CO—NH—NH—    (II)

and
  c) optionally a stabilizing compound other than a) and b).
  are also the subject matter of the invention in question.

The present invention also relates to a process for the preparation of these binder compositions.

Further, the present invention relates to coating, adhesive and sizing compositions containing the binder compositions according to the invention.

Finally, the present invention also relates to glass fibers sized with sizing compositions containing the binder compositions according to the invention.

20 Claims, No Drawings

STABILIZED AQUEOUS POLYURETHANE-POLYUREA DISPERSIONS

FIELD OF THE INVENTION

The present invention relates to aqueous polyurethane-polyurea dispersions which are stabilized with respect to thermal yellowing, and to their preparation and use.

BACKGROUND OF THE INVENTION

In the coating of substrates, aqueous binders, in particular polyurethane-polyurea (PU) dispersions, are increasingly being used. In some applications high temperatures, which lead to undesired yellowing of the coating, are required for drying the coatings.

In the area of sizing of glass fibers, PU dispersions are used as aqueous binders. Due to the comparatively high temperatures in the coating and drying processes and in the compounding of the sized glass fibers into a plastics matrix, thermal yellowing of the coatings produced often occurs and is undesired.

The prior art discloses numerous stabilizers and additives which can reduce thermal yellowing of binders. The use of these compounds in aqueous systems, such as PU dispersions, is often possible only to a limited extent. The systems disclosed in the prior art do not adequately meet the needs for protecting an aqueous PU dispersion or the coating resulting therefrom from thermal yellowing.

U.S. Pat. No. 5,216,078 discloses a stabilizer which significantly reduces the thermal yellowing of blocked isocyanates, in particular isocyanates blocked with butanone oxime. This compound is a hydrazine adduct.

EP-A 0 829 500 describes a combination of compounds as a stabilizer for blocked polyisocyanates, one of the compounds having at least one 2,2,6,6-tetramethylpiperidinyl radical, the so-called HALS (hindered amine light stabilizer) radical, and the other having a hydrazide structure.

However, the disadvantage of the abovementioned systems is that they are suitable only for solvent-containing finishes, coatings and sizing systems and not for aqueous systems.

The preparation of aqueous PU dispersions is known in principle. The various possibilities for preparing such dispersions are summarized, for example, by D. Dietrich in a review article (D. Dietrich, Prog. Org. Coatings 9, 281 (1981)). However, the problem of thermal yellowing has not been solved at present in a satisfactory manner in the prior art.

Therefore, it is an object of the present invention to provide PU dispersions which are stable to thermal yellowing and are suitable as one-component or two-component binders in finishes, sizes and coatings.

This object may be achieved with the aqueous PU dispersions according to the invention, which are protected from thermal yellowing by certain combinations of hydrazides and sterically hindered amines.

SUMMARY OF THE INVENTION

The present invention relates to a binder composition containing
A) at least one aqueous polyurethane-polyurea dispersion and
B) at least one stabilizer containing
  a) at least one amine having a structural unit corresponding to formula (I)

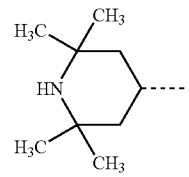

(I)

which has no hydrazide groups,
  b) at least one compound having a structural unit corresponding to formula (II)

—CO—NH—NH— (II)

and
  c) optionally a stabilizing compound other than a) and b).

The present invention also relates to a process for the preparation of these binder compositions.

The polyurethane dispersions are manufactured in the presence of components a) and b). It is possible for components a) and b), depending on the grade used, to be incorporated into the polymer framework as structural units.

For this reason binder compositions comprising
A) at least one aqueous polyurethane dispersion, containing structural units of at least one stabilizing agent or mixture of stabilizing agents B) based on
  a) at least one amine with the general formula (I),

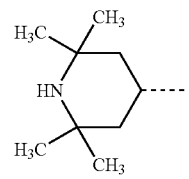

(I)

which has no hydrazide groups,
  b) at least one compound with the general formula (II),

—CO—NH—NH— (II)

and
  c) optionally a stabilizing compound other than a) and b),
are also the subject matter of the invention in question.

Further, the present invention relates to coating, adhesive and sizing compositions containing the binder compositions according to the invention.

Finally, the present invention also relates to glass fibers sized with sizing compositions containing the binder compositions according to the invention.

DETAILED DESCRIPTION OF THE INVENTION

The binder composition contains 78.0 to 99.8% by weight, preferably 84.0 to 99.6% by weight and more preferably 90.0 to 99.0% by weight, of component A); and 0.2 to 22.0% by weight, preferably 0.4 to 16.0% by weight and more preferably 1.0 to 10.0% by weight, of component B), wherein the sum of the components is 100% by weight, based on the solids contents of components A) and B).

Based on the total solids content, the binder compositions according to the invention contain 0.1 to 11.0% by weight, preferably 0.2 to 8.0% by weight and more preferably 0.5 to 4.0% by weight, of amines containing a stuctural unit corresponding to formula (I); 0.1 to 11.0% by fweight, preferably 0.2 to 8.0% by weight and more preferably 0.5 to 4.0% by weight, of hydrazides containing a structural unit corresponding to formula (II); and 0 to 5.0% by weight of stabilizers c), which differ from a) and b).

Suitable PU dispersions for use as component A) include those that are known in the prior art. PU dispersions (A) may be composed of the components A1) polyisocyanates, A2) polymeric polyols having number average molecular weights of 400 to 6 000 and A3) optionally mono- or polyalcohols and mono- or polyamines other than component A2), and at least one compound selected from A4) compounds which have at least one ionic or potential ionic group and A5) nonionic hydrophilic compounds.

In the context of the invention, a potential ionic group is a group which is capable of forming an ionic group.

Preferably, PU dispersions (A) contain 7 to 45% by weight, preferably 10 to 30% by weight and more preferably 8 to 27% by weight of A1); 50 to 91% by weight, preferably 65 to 90% by weight and more preferably 65 to 85% by weight of A2); 0 to 15% by weight, preferably 0 to 10% by weight and more preferably 0 to 8% by weight of A5); 0 to 12% by weight, preferably 3 to 9% by weight and more preferably 3 to 8% by weight of ionic or potentially ionic compounds A4); and optionally 0 to 30% by weight, preferably 0 to 10% by weight and more preferably 0 to 8% by weight of compounds A3), wherein the sum of the components is 100% by weight and the sum of components A4) and A5) is not 0.

Suitable diisocyanates (A1) include those having a molecular weight of 140 to 400 and having aliphatically, cycloaliphatically, araliphatically and/or aromatically bound isocyanate groups. Examples include 1,4-diisocyanatobutane, 1,6-diisocyanatohexane (HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1,3- and 1,4-bis-(isocyanatomethyl)-cyclohexane, 1-isocyanato-3,3,5-trimethyl-5-isocyanatomethylcyclohexane (isophorone diisocyanate or IPDI), 4,4'-diisocyanatodicyclohexylmethane, 1-isocyanato-1-methyl-4(3)-isocyanatomethylcyclohexane, bis-(isocyanatomethyl)-norbornane, 1,3- and 1,4-bis-(2-isocyanato-prop-2-yl)-benzene (TMXDI), 2,4- and 2,6-diisocyanatotoluene (TDI), 2,4'- and 4,4'-diisocyanatodiphenylmethane, 1,5-diisocyanatonaphthalene and mixtures thereof.

Preferred polyisocyanates are those having exclusively aliphatically and/or cycloaliphatically bound isocyanate groups, more preferably HDI, IPDI and/or 4,4'-diisocyanatodicyclohexylmethane.

Also suitable are lacquer polyisocyanates prepared from the preceding monomeric aliphatic, cycloaliphatic, araliphatic and/or aromatic diisocyanates and containing uretdione, isocyanurate, urethane, allophanate, biuret, iminooxadiazinedione and/or oxadiazinetrione groups, which are described, for example, in J. Prakt. Chem. 336 (1994), pages 185–200.

Suitable polymeric polyols (A2) include the known polyols having a number average molecular weight of 400 to 6000 and an OH functionality of 1.8 to 4. Examples include polyacrylates, polyesters, polylactones, polyethers, polycarbonates, polyester carbonates, polyacetals, polyolefins and polysiloxanes. Polyols having a number average molecular weight of 600 to 2 500 and an OH functionality of 2 to 3 are preferred.

Suitable polycarbonates having hydroxyl groups are obtained by reacting carbonic acid derivatives, e.g. diphenyl carbonate, dimethyl carbonate or phosgene, with diols. Suitable diols include ethylene glycol, 1,2- and 1,3-propanediol, 1,3- and 1,4-butanediol, 1,6-hexanediol, 1,8-octanediol, neopentylglycol, 1,4-bishydroxymethylcyclohexane, 2-methyl-1,3-propanediol, 2,2,4-trimethyl-1,3-pentanediol, dipropylene glycol, polypropylene glycols, dibutylene glycol, polybutylene glycols, bisphenol A, tetrabromobisphenol A and lactone-modified diols.

The diol component preferably contains 40 to 100% by weight of hexanediol, preferably 1,6-hexanediol, and/or hexanediol derivatives, preferably those which have ether or ester groups in addition to terminal OH groups. Examples include the product obtained by reacting 1 mole of hexanediol with at least 1 mole, preferably 1 to 2 moles, of caprolactone according to DE-A 17 70 245 or by etherifying hexanediol with itself to give di- or trihexylene glycol. The preparation of such derivatives is disclosed, for example, in DE-A 15 70 540. The polyether-polycarbonate diols described in DE-A 37 17 060 can also be used.

The polycarbonate polyols should be substantially linear. However, they may be slightly branched by incorporation of polyfunctional components, in particular low molecular weight polyols. Examples include glycerol, trimethylolpropane, 1,2,6-hexanetriol, 1,2,4-butanetriol, trimethylolpropane, pentaerythritol, quinitol, mannitol and sorbitol, methylglycoside and 1,3,4,6-dianhydrohexitols.

Suitable polyether polyols include the known polytetramethylene glycol polyethers and can be prepared, for example, via polymerization of tetrahydrofuran by cationic ring cleavage. Other suitable polyether polyols are those prepared by the alkoxylation of initiator molecules with styrene oxide, propylene oxide, butylene oxides or epichlorohydrins, in particular propylene oxide.

Suitable polyester polyols include the reaction products of polyhydric, preferably dihydric and optionally additionally trihydric, alcohols with polybasic, preferably dibasic, carboxylic acids. Instead of the free polycarboxylic acids, it is also possible to use the corresponding polycarboxylic anhydrides or corresponding polycarboxylic esters of lower alcohols or their mixtures for the preparation of the polyester. The polycarboxylic acids may be aliphatic, cycloaliphatic, aromatic and/or heterocyclic and are optionally substituted, for example by halogen atoms, and/or unsaturated.

Monofunctional alcohols and monoamines, which are suitable for for terminating the polyurethane prepolymer may be used as component (A3). Preferred monoalcohols include aliphatic monoalcohols having 1 to 18 C atoms, such as ethanol, n-butanol, ethylene glycol monobutyl ether, 2-ethylhexanol, 1-octanol, 1-dodecanol and 1-hexadecanol. Preferred monoamines are aliphatic monoamines, such as diethylamine, dibutylamine, ethanolamine, N-methylethanolamine or N,N-diethanolamine.

Polyols, aminopolyols or polyamines which are known and have a number average molecular weight of less than 400 are also suitable as component (A3).

Examples of preferred components (A3) are:

a) alkanediols, such as ethanediol, 1,2- and 1,3-propanediol, 1,4- and 2,3-butanediol, 1,5-pentanediol, 1,3-dimethylpropanediol, 1,6-hexanediol, neopentylglycol, cyclohexanedimethanol and 2-methyl-1,3-propanediol, b) etherdiols, such as diethylene diglycol, triethylene glycol or hydroquinone dihydroxyethyl ether, c) esterdiols corresponding to formulas (III) and (IV)

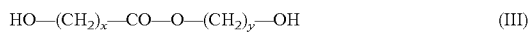
$$HO-(CH_2)_x-CO-O-(CH_2)_y-OH \qquad (III)$$

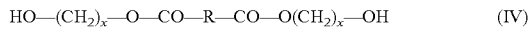
$$HO-(CH_2)_x-O-CO-R-CO-O(CH_2)_x-OH \qquad (IV)$$

wherein

R is an alkylene or arylene radical having 1 to 10 C atoms, preferably 2 to 6 C atoms, x is 2 to 6 and y is 3 to 5, such as α-hydroxybutyl ε-hydroxycaproate, ω-hydroxyhexyl γ-hydroxybutyrate, β-hydroxyethyl adipate and bis (β-hydroxyethyl) terephthalate, and d) polyamines, such as ethylenediamine, 1,2- and 1,3-diaminopropane, 1,4-diaminobutane, 1,6-diaminohexane, isophoronediamine, isomer mixture of 2,2,4- and 2,4,4-trimethylhexa-methylenediamine, 2-methyl-pentamethylenediamine, diethylene-triamine, 1,3- and 1,4-xylylenediamine, α,α,α',α',-tetramethyl-1,3- and -1,4-xylylenediamine and 4,4-diaminodicyclohexylmethane. Suitable diamines in the context of the invention are also hydrazine, hydrazine hydrate and substituted hydrazines, such as N-methylhydrazine, N,N'-dimethylhydrazine and their homologs and acid dihydrazides, adipic acid, β-methyladipic acid, sebacic acid, hydracrylic acid and terephthalic acid, semicarbazidoalkylene hydrazides such as β-semicarbazidopropionic acid hydrazide (e.g. DE-A 17 70 591), semicarbazidoalkylene-carbazine esters such as 2-semicar-bazidoethylcarbazine ester (e.g. DE-A 19 18 504) and aminosemicarbazide compounds such as β-aminoethyl semicarbazido-carbonate (e.g. DE-A 19 02 931).

Suitable ionic or potential ionic compounds (A4) include mono- and dihydroxycarboxylic acids, mono- and diaminocarboxylic acids, mono- and dihydroxysulphonic acids, mono- and diaminosulphonic acids, mono- and dihydroxyphosphonic acids and mono- and diaminophosphonic acids and their salts. Examples include dimethylolpropionic acid, hydroxypivalic acid, N-(2-aminoethyl)-β-alanine, 2-(2-amino-ethylamino)-ethanesulphonic acid, ethylenediaminepropanesulphonic, ethylenediamine-butanesulphonic acid, 1,2- or 1,3-propylenediamine-β-ethylsulphonic acid, lysine or 3,5-diaminobenzoic acid. The hydrophilic agent according to Example 1 of EP-A 0 916 647 and its alkali metal and/or ammonium salts are also suitable. The adduct of sodium bisulphite with but-2-ene-1,4-diol, polyethersulphonate, the propoxylated adduct of 2-butenediol and NaHSO$_3$ (e.g. in DE-A 24 46 440, pages 5–9, U.S. Pat. No. 4,108,814) and building blocks, such as N-methyldiethanolamine, which can be converted into cationic groups, can also be used as hydrophilic components.

Preferred ionic or potential ionic compounds (A4) are those which have carboxyl, carboxylate, sulphonate groups and/or ammonium groups. Particularly preferred ionic compounds (A4) are those which contain carboxylate and/or sulphonate groups as ionic or potential ionic groups, such as the salts of N-(2-aminoethyl)-β-alanine or 2-(2-aminoethylamino)-ethanesulphonic acid, the hydrophilic agent according to Example 1 of EP-A 0 916 647 and dimethylolpropionic acid.

Preferably, PU dispersions (A) contain a combination of nonionic and ionic hydrophilic agents. Combinations of nonionic and anionic hydrophilizing agents are particularly preferred.

The hydroxy components among components (A2), (A3) and (A4) may contain double bonds which may originate, for example, from long-chain aliphatic carboxylic acids or fatty alcohols. Functionalization with olefinic double bonds is possible, for example, by the incorporation of allylic groups or acrylic acid or methacrylic acid and their respective esters.

Polyurethane dispersions (A) may contain nonionic hydrophilic compounds (A5), such as polyoxyalkylene ethers having at least one hydroxyl or amino group. These polyethers contain a proportion of 30% by weight to 100% by weight of building blocks which are derived from ethylene oxide. Also suitable are linear polyethers having a functionality of 1 to 3 and compounds corresponding to formula (V)

wherein $R^1$ and $R^2$ independently of one another, each represent a divalent aliphatic, cycloaliphatic or aromatic radical having 1 to 18 carbon atoms, which may be interrupted by oxygen and/or nitrogen atoms, and $R^3$ represents a non-hydroxyl-terminated polyester or polyether, preferably a polyether and more preferably an alkoxy-terminated polyethylene oxide radical.

The preparation of aqueous polyurethane dispersions (A) is carried out in known manner. The polyisocyanate component, polymeric polyol and low molecular weight chain extender are reacted to give a polyurethane. A solvent, which can be separated off, may optionally be used. Suitable solvents are known and include ethyl acetate, butyl acetate, 1-methoxyprop-2-yl acetate, 3-methoxy-n-butyl acetate, acetone, 2-butanone, 4-methyl-2-pentanone, cyclohexanone, toluene, xylene, chlorobenzene, mineral spirits; mixtures which contain substituted aromatics, which are commercially available, for example, under the names Solvent Naphtha, Solvesso® (Exxon Chemicals, Houston, USA), Cypar® (Shell Chemicals, Eschborn, DE), Cyclo Sol® (Shell Chemicals, Eschborn, DE), Tolu Sol® (Shell Chemicals, Eschborn, DE), Shellsol® (Shell Chemicals, Eschborn, DE); carbonic acid esters such as dimethyl carbonate, diethyl carbonate, 1,2-ethylene carbonate and 1,2-propylene carbonate; lactones such as β-propiolactone, γ-butyrolactone, ε-caprolactone and ε-methylcaprolactone; propylene glycol diacetate, diethylene glycol dimethyl ether, dipropylene glycol dimethyl ether, diethylene glycol ethyl and butyl ether acetate, N-methylpyrrolidone, N-methylcaproiactam and mixtures thereof. Preferred solvents are acetone, 2-butanone and N-methylpyrrolidone. Acetone is particularly preferred.

In a further step, groups capable of neutralization (potential ionic groups) are then optionally converted into the salt form and transferred to the aqueous phase. Depending on the degree of neutralization and content of ionic groups, the dispersion may be very finely divided so that it has the appearance of a solution or very coarse. Either are sufficiently stable. However, mean particle sizes of less than 300 nm are preferred since these improve the emulsification of a polyisocyanate and hence the quality of the coating. The solids content may be varied within limits from 10 to 70% by weight.

The binder compositions according to the invention preferably contain PU dispersions (A), which have been prepared by the known acetone process.

Excess isocyanate groups can be reacted by reaction with polyfunctional isocyanate-reactive compounds (A3). Water, polyamines (A3) (preferably di- and triamines), hydrazine and the sodium salt of 2-(2-amino-ethylamino)-ethanesulphonic acid are preferably used for this purpose. Termination with a monoamine, such as diethylamine, dibutylamine, ethanolamine, N-methylethanolamine and N,N-diethanolamine is also possible.

Optionally used solvents can then be removed by distillation.

It is also possible to modify the binder compositions according to the invention with polyacrylates. For this purpose, an emulsion polymerization of olefinically unsaturated monomers, for example esters of (meth)acrylic acid and alcohols having 1 to 18 carbon atoms, styrene, vinyl esters and/or butadiene, is carried out in the presence of polyurethane dispersion (A), as described, for example, in DE-A 19 53 348, EP-A 0 167 188, EP-A 0 189 945 and EP-A 0 308 115.

In addition to one or more olefinic double bonds, the monomers may also contain functional groups, such as hydroxyl, epoxy, methylol or acetoacetoxy groups. The emulsion polymerization can be carried out before or after the modification with component (B).

The compositions according to the invention contain a stabilizer mixture B) which contains a) an amine having a structural unit corresponding to formula (I)

Suitable compounds a) are those which have a 2,2,6,6-tetramethylpiperidinyl radical (HALS ring). The piperidinyl nitrogen of the HALS ring is not substituted and has no hydrazide structures at all. Preferred compounds a) are the compounds shown in Table 1.

TABLE 1

Compounds a)

| CAS Reg. No. | Structure |
|---|---|
| 24860-22-8 | HN-piperidinyl-O-C(=O)-(CH₂)ₙ-CH₃, n = 14, 16, 18-Mixture |
| 79720-19-7 | H-N-piperidinyl-N-succinimidyl-C₁₂H₂₆ |
| 64338-16-5 | H-N-piperidinyl-spiro-oxazolidinone with (CH₂)₉ chain |
| 52829-07-9 | H-N-piperidinyl-O-C(=O)-(CH₂)₈-C(=O)-O-piperidinyl-N-H |

TABLE 1-continued
Compounds a)
| CAS Reg. No. | Structure |
|---|---|
| 99473-08-2 | 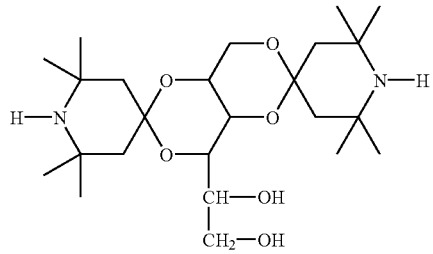 |
| 71029-16-8 | 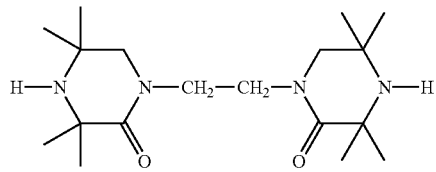 |
| 71878-19-8 | 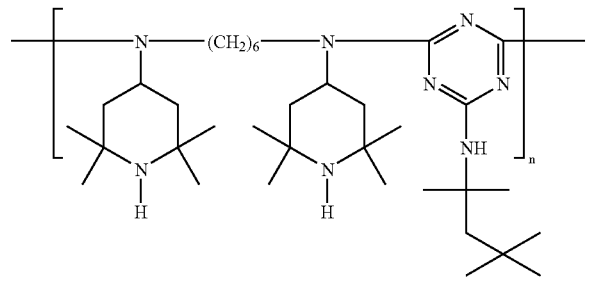 |
| 90751-07-8 | 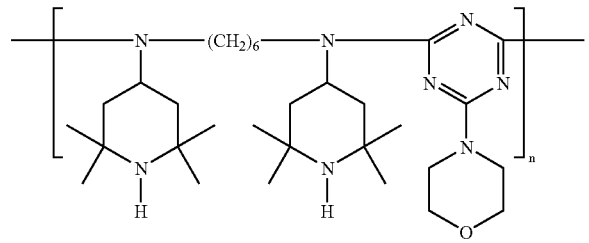 |
| 154636-38-1 | 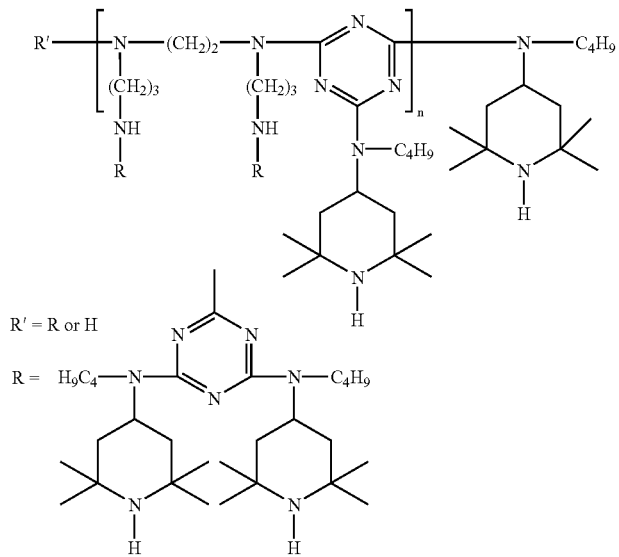 |

TABLE 1-continued
Compounds a)
| CAS Reg. No. | Structure |
|---|---|
| 100631-44-5 | 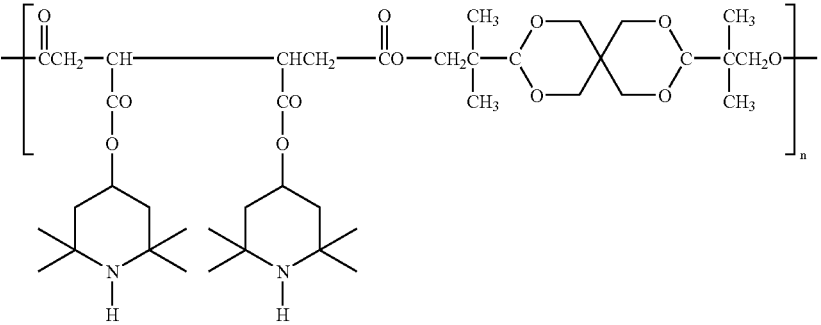 |
| 115810-23-6 | 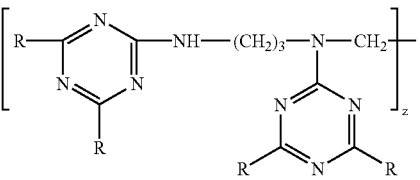 |
| 164648-93-5 | 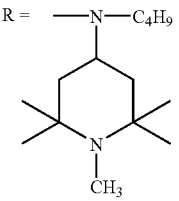 |

TABLE 1-continued

Compounds a)

| CAS Reg. No. | Structure |
|---|---|
| 96204-36-3 | 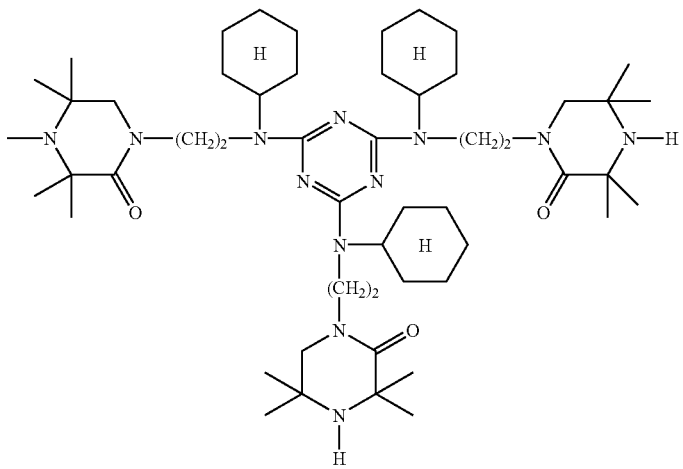 |

A compound of formula (VI), which is sold, for example, under the name Tinuvin® 770 DF by Ciba Spezialitäten (Lampertheim, DE), is particularly preferred:

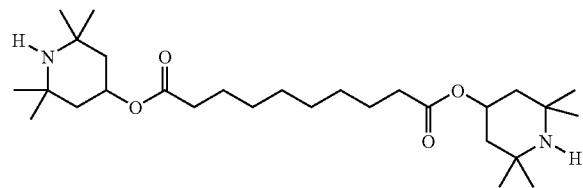

(VI)

The stabilizer B) of the compositions according to the invention also contains a compound b) corresponding to formula (II)

—CO—NH—NH— (II).

Suitable compounds b) include acid hydrazides and acid dihydrazides, such as acetic acid hydrazide, adipic acid hydrazide and adipic acid dihydrazide; and hydrazine adducts of hydrazine and cyclic carbonates, as described, for example, in EP-A 654 490 (page 3, line 48 to page 4, line 3).

Adipic acid dihydrazide and the adduct of 2 moles of propylene carbonate and 1 mole of hydrazine corresponding to formula (VII)

(VII)

are preferably used. The adduct of 2 moles of propylene carbonate and 1 mole of hydrazine is particularly preferred.

Suitable compounds c) include antioxidants such as 2,6-di-tert-butyl-4-methylphenol; UV absorbers of the 2-hydroxyphenyl-benzotriazole type; light stabilizers of the HALS type wherein the nitrogen atom is substituted, such as Tinuvin® 292 (Ciba Spezialitäten GmbH, Lampertheim, DE); and other commercially available stabilizers, as described, for example, in "Lichtschutzmittel für Lacke" [Light stabilizers for finishes] (A. Valet, Vincentz Verlag, Hanover, 1996, and "Stabilization of Polymeric Materials" (H. Zweifel, Springer Verlag, Berlin, 1997, Appendix 3, pages 181–213). Preferred compounds c) are shown in Table 2.

TABLE 2

Compounds c)

| CAS Reg. No. | Structure |
|---|---|
| 10191-41-0 | 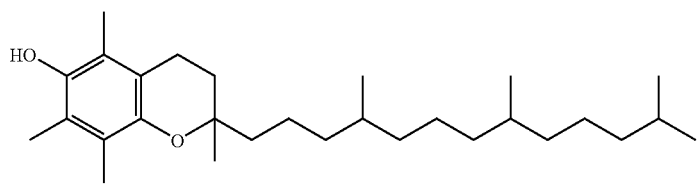 |

TABLE 2-continued

Compounds c)

| CAS Reg. No. | Structure |
|---|---|
| 128-37-0 | 2,6-di-tert-butyl-4-methylphenol |
| 2082-79-3 | 3,5-di-tert-butyl-4-hydroxyphenyl-(CH$_2$)$_2$-C(=O)OC$_{18}$H$_{37}$ |
| 12643-61-0 | 3,5-di-tert-butyl-4-hydroxyphenyl-(CH$_2$)$_2$-C(=O)-OC$_6$H$_{17}$ |
| 119-47-1 | 2,2'-methylenebis(6-tert-butyl-4-methylphenol) |
| 35074-77-2 | [3,5-di-tert-butyl-4-hydroxyphenyl-(CH$_2$)$_2$-C(=O)-O-(CH$_2$)$_3$-]$_2$ |
| 23128-74-7 | [3,5-di-tert-butyl-4-hydroxyphenyl-(CH$_2$)$_2$-C(=O)-NH-(CH$_2$)$_3$-]$_2$ |

TABLE 2-continued

Compounds c)

| CAS Reg. No. | Structure |
|---|---|
| 976-56-7 | 3,5-di-tert-butyl-4-hydroxybenzyl phosphonate diethyl ester |
| 65140-91-2 | calcium bis[monoethyl(3,5-di-tert-butyl-4-hydroxybenzyl)phosphonate] |
| 36443-68-2 | bis[2-(2-(3,5-di-tert-butyl-4-hydroxyphenyl)propionyloxy)ethoxy]methane derivative |
| 85-60-9 | 4,4'-butylidenebis(2-tert-butyl-5-methylphenol) |
| 90498-90-1 | bis-(3-tert-butyl-4-hydroxy-5-methylphenyl)propionate of bicyclic diol |
| 1709-70-2 | 1,3,5-trimethyl-2,4,6-tris(3,5-di-tert-butyl-4-hydroxybenzyl)benzene |

TABLE 2-continued

Compounds c)

| CAS Reg. No. | Structure |
| --- | --- |
| 1843-03-4 | |
| G34137-09-2 | |
| 27676-62-6 | |
| 40601-76-1 | |
| 6683-19-8 | |

TABLE 2-continued

Compounds c)

| CAS Reg. No. | Structure |
|---|---|
| 32509-66-3 | |
| 31851-03-3 | |
| 96-69-5 | |
| 90-66-4 | |
| 110553-27-0 | |
| 41484-35-9 | |

TABLE 2-continued

Compounds c)

| CAS Reg. No. | Structure |
|---|---|
| 991-84-4 | 2,4-bis(octylthio)-6-(3,5-di-tert-butyl-4-hydroxyanilino)-1,3,5-triazine |
| 103-99-1 | N-(4-hydroxyphenyl)stearamide: HO–C₆H₄–NH–C(=O)–C₁₇H₃₅ |
| 63843-89-0 | bis[1-methyl-2,2,6,6-tetramethylpiperidin-4-yl] 2-butyl-2-(3,5-di-tert-butyl-4-hydroxybenzyl)malonate |
| 4221-80-1 | 2,4-di-tert-butylphenyl 3,5-di-tert-butyl-4-hydroxybenzoate |
| 67845-93-6 | hexadecyl 3,5-di-tert-butyl-4-hydroxybenzoate |
| 61167-58-6 | 2-tert-butyl-6-(3-tert-butyl-2-hydroxy-5-methylbenzyl)-4-methylphenyl acrylate |

TABLE 2-continued

Compounds c)

| CAS Reg. No. | Structure |
|---|---|
| 128961-68-2 | |
| 135-88-6 | |
| 26780-96-1 | |
| 101-72-4 | |
| 90-30-2 | |
| 68411-46-1 | |
| 10081-67-1 | |
| 32687-78-8 | |

TABLE 2-continued
Compounds c)
| CAS Reg. No. | Structure |
|---|---|
| 70331-94-1 | 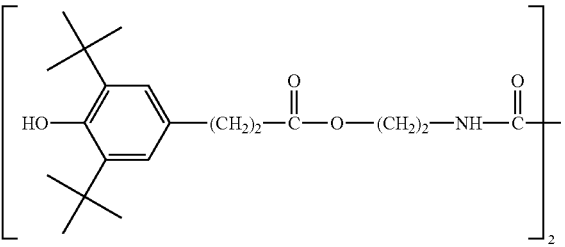 |
| 6629-10-3 | 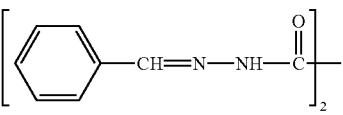 |
| 26523-78-4 |  |
| 31570-04-4 | 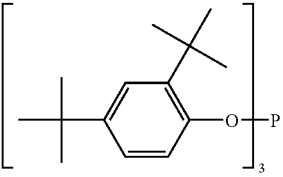 |
| 26741-53-7 | 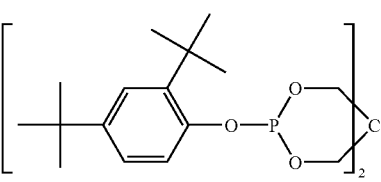 |
| 80693-00-1 | 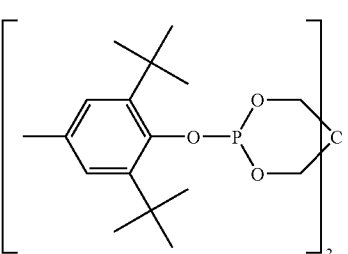 |
| 140221-14-3 | 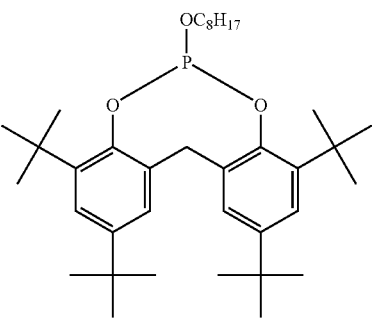 |

TABLE 2-continued

Compounds c)

| CAS Reg. No. | Structure |
|---|---|
| 38613-77-3 | [Structure: bis(2,4-di-tert-butylphenoxy)phosphite linked to phenylene, subscript 2] |
| 118337-09-0 | [Structure: fluorophosphite of 2,2'-methylenebis(4,6-di-tert-butylphenol)] |
| 3806-34-6 | [$H_{37}C_{16}$—O—P(OCH$_2$)$_3$C]$_2$ bicyclic phosphite |
| 80410-33-9 | [Structure: tris(2,2'-ethylidenebis(4,6-di-tert-butylphenyl)) phosphite with N, subscript 3] |
| 693-36-7 | [$H_{37}C_{18}$O—C(=O)—CH$_2$—CH$_2$]$_2$S |
| 123-28-4 | [$H_{25}C_{12}$O—C(=O)—CH$_2$—CH$_2$]$_2$S |

TABLE 2-continued

Compounds c)

| CAS Reg. No. | Structure |
| --- | --- |
| 16545-54-3 | [H$_{29}$C$_{14}$O—C(=O)—CH$_2$—CH$_2$]$_2$S |
| 2500-88-1 | [H$_{37}$C$_{18}$—S]$_2$ |
| 131-57-7 | 2-hydroxy-4-methoxybenzophenone (OCH$_3$) |
| 1843-05-6 | 2-hydroxy-4-octyloxybenzophenone (OC$_8$H$_{17}$) |
| 2985-59-3 | 2-hydroxy-4-dodecyloxybenzophenone (OC$_{12}$H$_{25}$) |
| 43221-33-6 | [2-hydroxy-4-(O(CH$_2$)$_3$)benzophenone]$_2$ |
| 57472-50-1 | 2-hydroxybenzophenone with OCH$_3$ and CH$_2$ bridge, subscript 2 |
| 2440-22-4 | 2-(2H-benzotriazol-2-yl)-4-methylphenol |

TABLE 2-continued

Compounds c)

| CAS Reg. No. | Structure |
|---|---|
| 3147-75-9 | |
| 3896-11-5 | |
| 3846-71-7 | |
| 23328-53-2 | |
| 25973-55-1 | |
| 36437-37-3 | |

TABLE 2-continued
Compounds c)
| CAS Reg. No. | Structure |
|---|---|
| 3864-99-1 | 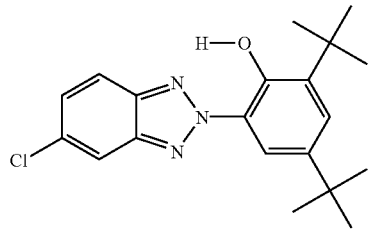 |
| 70321-86-7 | 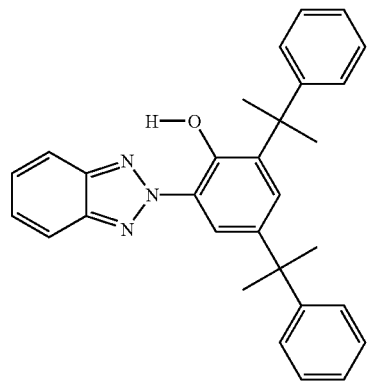 |
| 103597-45-1 | 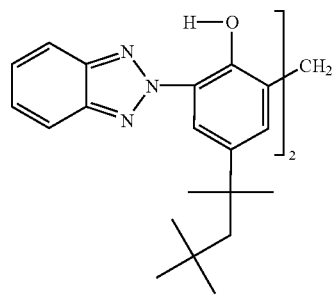 |
| 84268-08-6 | 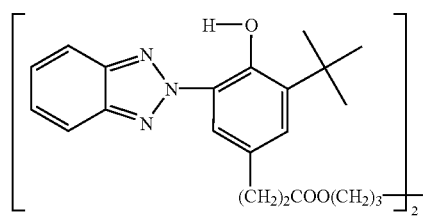 |
| 147315-50-2 | 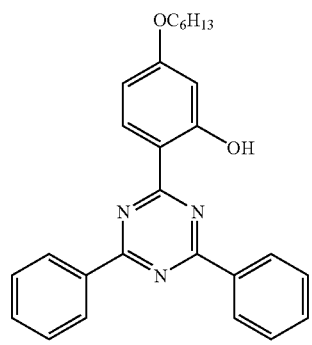 |

TABLE 2-continued

Compounds c)

| CAS Reg. No. | Structure |
|---|---|
| 2725-22-6 | |
| 23949-66-8 | |
| 35001-52-6 | |
| 7443-25-6 | |
| 106917-30-0 | |
| 41556-26-7 | |
| 65447-77-0 | |

TABLE 2-continued

Compounds c)

| CAS Reg. No. | Structure |
|---|---|
| 78276-66-1 | [structure] |
| 130277-45-1 | [structure] |

The binder compositions according to the invention are obtained by reacting component A1) with components A2), A3), A4), A5), a), b) and c) in any desired sequence, optionally with the aid of an organic solvent. Suitable methods, known from the prior art, for the preparation of PU dispersions include the emulsifier shear force process, the acetone process, the prepolymer mixing process, the melt emulsification process, the ketimine process, the solid spontaneous dispersing process and derivatives thereof. A summary of these methods appears in "Methoden der organischen Chemie" [Methods of organic chemistry] (Houben-Weyl, supplementary and subsequent volumes for the 4th edition, Volume E20, H. Bartl and J. Falbe, Stuttgart, New York, Thieme 1987, pages 1617–1682).

Preferably, A1) is first reacted with components A2), A5), a) and b), optionally in the presence of a catalyst. The resulting prepolymer is then dissolved in a solvent, optionally in combination with components b) and/or c), and components A3) and A4) are then added. The resulting hydrophilic prepolymer is dissolved in a solvent and converted into an aqueous dispersion or solution in a further step by adding water. In addition, it is also possible to add additional components A3) and A4). The organic solvent used can be removed by distillation after the dispersion is formed.

The binder compositions according to the invention have a solids content of 10 to 70% by weight, preferably 20 to 60% by weight and more preferably 25 to 60% by weight. The proportion of organic solvent, based on the total composition, is preferably less than 15% by weight, more preferably less than 5% by weight.

The binder compositions according to the invention are used either alone or in combination with other aqueous binders for the preparation of coating compositions. These other aqueous binders include polyester polymers, polyacrylate polymers, polybutadiene polymers, polyvinyl acetate polymers, polyepoxide polymers and other polyurethane polymers. They may also be used in combination with radiation-curable binders as described, for example, in EP-A-0 753 531.

Coatings prepared from the compositions according to the invention can be applied to any desired substrates, for example metal, wood, glass, glass fibers, carbon fibers, stone, ceramic minerals, concrete, rigid and flexible plastics, woven and nonwoven textiles, leather, paper, hard fibers, straw and bitumen. These substrates can optionally be provided with customary primer coats prior to coating. Preferred substrates are glass fibers, carbon fibers, metals, textiles and leather. A particularly preferred substrate is glass fibers.

The binder compositions according to the invention can be used alone or in combination with the additives known from coating technology. Examples include nonionic and/or anionic thickeners, fillers, pigments, waxes, handle compositions, dyes, solvents, leveling agents and crosslinking agents.

It is also possible to add crosslinking agents prior to application. Hydrophilic polyisocyanate crosslinking agents are preferably used.

The coating compositions can be applied by known methods, such as brushing, pouring, knife coating, spraying, rolling and immersion. The coating can be dried at room temperature or elevated temperatures of up to 200° C.

The binder compositions according to the invention are storable and shippable and can be processed at any desired later time. Depending on the chosen chemical composition of the polyurethane, coatings having different properties are obtained. Thus, soft tacky coats and thermoplastic and elastomeric products having a wide range of hardnesses up to glass-hard thermosetting plastics can be obtained. Thus, the binder compositions according to the invention can also be used as adhesives, but their use in glass fiber sizes is preferred.

The binder compositions according to the invention can be used in the sizes alone or preferably with other binders, such as polyacrylate dispersions, polyurethane-polyacrylate hybrid dispersions, polyvinyl ether or polyvinyl ester dispersions, polystyrene or polyacrylonitrile dispersions. They can also be used with crosslinking agents, such as blocked polyisocyanates and amino crosslinking resins, such as melamine resins.

To prepare the sizes, the binder compositions according to the invention are used as binder components and may contain other components, such as emulsifiers, other film-forming resins, adhesion promoters, lubricants and additives, e.g., wetting agents or antistatic agents. The adhesion promoters, lubricants and additives, the process for preparing the sizes, and the process for sizing glass fibers and the subsequent processing of the glass fibers are known and described, for example, in K. L. Loewenstein, "The Manufacturing Technology of Continuous Glass Fibers", Elsevier Scientific Publishing Corp., Amsterdam, London, New York, 1983.

Both the known glass types used for glass filament manufacture, such as E, A, C and S glass, and the other known products from glass fiber manufacturers are suitable for the sized glass fibers. Among the glass types for the production of continuous glass filaments, the E glass fibers, because of freedom from alkali, high tensile strength and high modulus of elasticity, are the most important for reinforcing plastics.

Both thermoplastic and duromeric polymers can be used as matrix polymers.

The invention is further illustrated but is not intended to be limited by the following examples in which all parts and percentages are by weight unless otherwise specified.

EXAMPLES

Compounds Used:
Diaminosulphonate: $NH_2—CH_2CH_2—NH—CH_2CH_2—SO_3Na$ (45% in water)
Determination of Thermal Yellowing:

The binder compositions described below were applied to test metal sheets which have been coated with a commercial, white base coat from Spies & Hecker, in a wet film thickness of 120 μm. The test metal sheets were dried for 30 minutes at room temperature and then baked for 30 minutes at 170° C. in a drying oven. Thereafter, the color measurement was carried out by the CIELAB method. The greater the determined positive b* value, the greater was the resulting yellow discoloration of the coating prepared from the binder composition.

Example 1

Comparison Example Prior Art PU Dispersion for Glass Fiber Sizes

Baybond® PU 401 (anionic-nonionic PU dispersion having a solids content of 40% and a mean particle size of 100–300 nm, Bayer AG, Leverkusen, DE.)

Example 2

Comparison Example 1 377.0 g of polyester PE 170 HN (Bayer AG, Leverkusen, DE, polyester polyol, OH number 66, molecular weight 1700), 66.8 g of polyether LB 25 (Bayer AG, Leverkusen, DE, monofunctional polyether based on ethylene oxide/propylene oxide and having an average molecular weight of 2250, OH number 25) and 0.1 g of Desmorapid® Z (Bayer AG, Leverkusen, DE) were heated to 65° C. Thereafter, a mixture of 499.5 g of isophorone diisocyanate and 343.1 g of acetone was added at 65° C. over a period of 5 min and stirring was carried out under reflux until the theoretical NCO value was reached. The resulting prepolymer was dissolved in 1760.4 g of acetone at 50° C. and then a solution of 47.3 g of adipic acid dihydrazide, 9.0 g of hydrazine hydrate, 21.4 g of isophorone diamine and 419.0 g of water was metered in within 10 min. After the addition of 189.9 g of diaminosulphonate, stirring was continued for 15 min and a dispersion was prepared by adding 2628.1 g of water within 20 min. This was followed by the removal of the solvent by distillation under vacuum. A storage stable dispersion having a solids content of 40.5% was obtained.

Example 3

Comparison Example 1496.0 g of Polyester PE 170 HN (Bayer AG, Leverkusen, DE, polyester polyol, OH number 66, molecular weight 1700), 54.0 g of Polyether LB 25 (Bayer AG, Leverkusen, DE., monofunctional polyether based on ethylene oxide/propylene oxide and having an average molecular weight of 2250, OH number 25) and 0.1 g of Desmorapid® Z (Bayer AG, Leverkusen, DE) were heated to 65° C. Thereafter, a mixture of 444.4 g of isophorone diisocyanate and 352.0 g of acetone was added at 65° C. within 5 min and stirring was continued under reflux until the theoretical NCO value was reached. The resulting prepolymer was dissolved in a solution of 16.0 g of Irganox® 245 (Ciba Spezialitäten GmbH, Lampertheim, DE), 16.0 g of Tinuvin® 770 DF (Ciba Spezialitäten GmbH, Lampertheim, DE) and 1671.1 g of acetone at 50° C. A solution of 9.0 g of hydrazine hydrate, 19.0 g of isophorone diamine and 121.6 g of water was then metered in within 10 min. After the addition of 168.8 g of diaminosulphonate, stirring was continued for 15 min and a dispersion was prepared by adding 2971.9 g of water within 20 min. This was followed by the removal of the solvent by distillation under vacuum. A storage stable dispersion having a solids content of 40.4% was obtained.

Example 4

According to the Invention 1377.0 g of Polyester PE 170 HN (Bayer AG, Leverkusen, DE, polyesterpolyol, OH number 66, molecular weight 1700), 60.8 g of Polyether LB 25 (Bayer AG, Leverkusen, DE, monofunctional polyether based on ethylene oxide/propylene oxide and having an average molecular weight of 2250, OH number 25) and 44.6 g of the hydrazine adduct of formula VII (reaction product of 1 mole of hydrazine hydrate and 2 moles of propylene carbonate, molecular weight of 236), and 0.1 g of Desmorapid® Z (Bayer AG, Leverkusen, DE) were heated to 65° C. Thereafter, a mixture of 499.5 g of isophorone diisocyanate and 349.8 g of acetone was added at 65° C. within 5 min and stirring was carried out under reflux until the theoretical NCO value was reached. The resulting prepolymer was dissolved by adding a solution of 1880.0 g of acetone, 11.2 g of Irganox® 245 (Ciba Spezialitäten GmbH, Lampertheim, DE) and 11.2 g of Tinuvin® 770 DF (Ciba Spezialitäten GmbH, Lampertheim, DE) at 50° C. A solution of 7.8 g of adipic acid dihydrazide, 9.0 g of hydrazine hydrate, 21.4 g of isophoronediamine and 136.6 g of water was then metered in within 10 min. After the addition of 189.9 g of diaminosulphonate, stirring was continued for 15 min and a dispersion was prepared by adding 2942.7 g of water within 20 min. This was followed by the removal of the solvent by distillation under vacuum. A storagestable dispersion having a solids content of 40.8% was obtained.

TABLE 3

|  | Example 1 Baybond ® PU 401 (Comparison example, prior art) | Example 2 (Comparison example) | Example 3 (Comparison example) | Example 4 (according to the invention) |
|---|---|---|---|---|
| Solids content [1%] | 40% | 40.5 | 40.4 | 40.8 |
| Mean particle size [nm] | 100–300 nm | 161.0 | 165.5 | 162.7 |
| Compound of the formula VII | — | — | — | X |
| Tinuvin 770 DF | — | — | X | X |
| Adipic acid dihydrazide | — | X | — | X |
| CIE/LAB b* values | 1.3 | 0.5 | 0.9 | 0.0 |

The results set forth in Table 3 demonstrate that the PU dispersion of Example 4, according to the invention, exhibits substantially less yellowing compared with PU dispersions of the prior art (Example 1) and conventionally stabilized PU dispersions (Examples 2 and 3).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A binder composition comprising
A) at least one aqueous polyurethane-polyurea dispersion and
B) at least one stabilizer comprising
   a) at least one amine having a structural unit corresponding to formula (I)

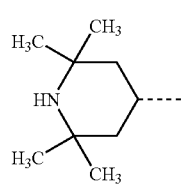

(I)

which has no hydrazide groups, b) at least one compound having a structural unit corresponding to formula (II)

—CO—NH—NH— (II)

and c) optionally a stabilizing compound other than a) and b), wherein the stabilizer is covalently bonded to the polyurethane-polyurea backbone.

2. A binder composition comprising
A) at least one aqueous polyurethane dispersion, containing structural units of at least one stabilizing agent or mixture of stabilizing agents
B) based on
   a) at least one amine having a structural unit corresponding to formula (I),

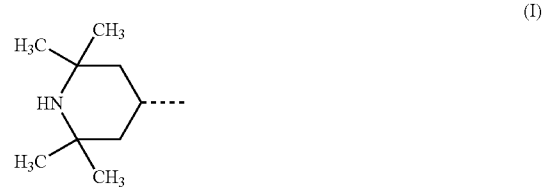

which has no hydrazide groups, b) at least one compound having a structural unit corresponding to formula (II),

—CO—NH—NH— (II)

and c) optionally a stabilizing compound other than a) and b), wherein the stabilizing agent is covalently bonded to the polyurethane-polyurea backbone.

3. The binder composition of claim 1 or 2 which contains 78.0 to 99.8% by weight of component A) and 0.2 to 22.0% by weight of component B), wherein the sum of the components is 100%, based on the solids contents of components A) and B).

4. The binder composition of claim 1 or 2 which contains 0.1 to 11.0% by weight of an amine containing a structural unit corresponding to formula (I), 0.1 to 11.0% by weight of a hydrazide containing a structural unit corresponding to formula (II) and 0 to 5.0% by weight of a stabilizer c), wherein the percentages are based on the total solids content of the binder composition.

5. The binder composition according to claim 1 or 2 wherein characterized in that polyurethane-polyurea dispersion (A) is the reaction product of
A1) a polyisocyanate,
A2) a polymeric polyol having a number average molecular weight of 400 to 6 000 and
A3) optionally a mono- or polyalcohol or a mono- or polyamine other than component A2)
and at least one compound selected from
A4) a compound which has at least one ionic or potential ionic group and/or
A5) a nonionic hydrophilic compound.

6. The binder composition of claim 5 wherein polyurethane-polyurea dispersion (A) contains 7 to 45% by weight of A1), 50 to 91% by weight of A2), 0 to 15% by weight of A5), 0 to 12% by weight of A4) and 0 to 30% by weight of A3), wherein the sum of the components is 100% by weight and the sum of components A4) and A5) is not 0.

7. The binder composition of claim 1 or 2 wherein amine a) comprises a compound corresponding to formula (VI)

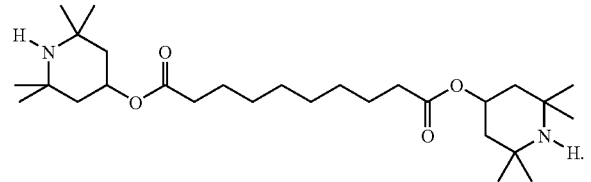
(VI)

8. The binder composition of claim 5 wherein amine a) comprises a compound corresponding to formula (VI)

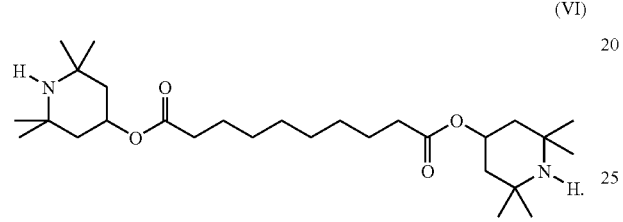
(VI)

9. The binder composition of claim 6 wherein amine a) comprises a compound corresponding to formula (VI)

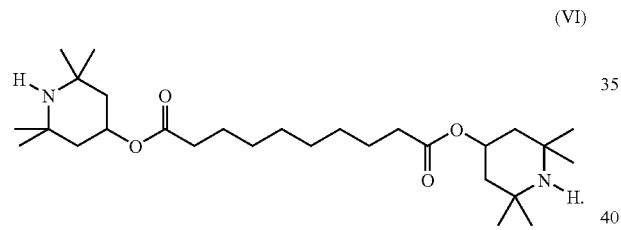
(VI)

10. The binder composition of claim 1 or 2 wherein compound b) comprises a compound of formula (VII)

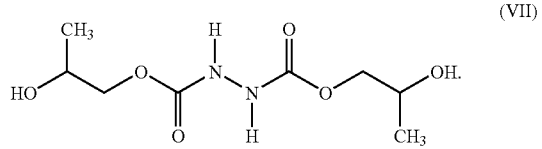
(VII)

11. The binder composition of claim 5 wherein compound b) comprises a compound of formula (VII)

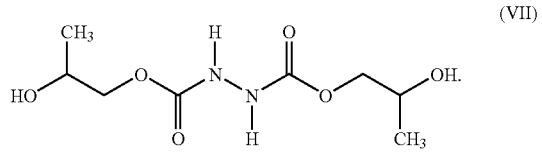
(VII)

12. The binder composition of claim 6 wherein compound b) comprises a compound of formula (VII)

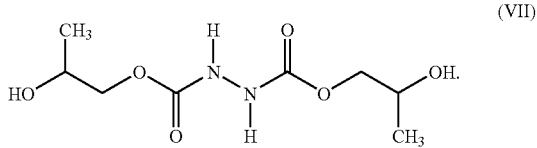
(VII)

13. The binder composition of claim 7 wherein compound b) comprises a compound of formula (VII)

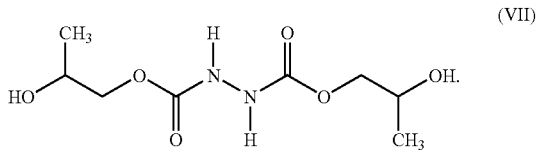
(VII)

14. The binder composition of claim 8 wherein compound b) comprises a compound of formula (VII)

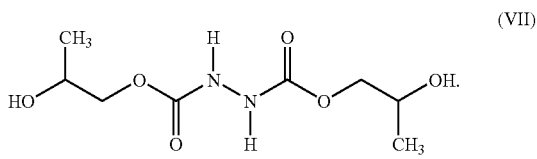
(VII)

15. The binder composition of claim 9 wherein compound b) comprises a compound of formula (VII)

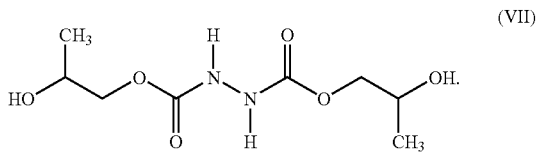
(VII)

16. A process for preparing the binder composition of claim 5 which comprises
   i) reacting component A1) with components A2), A5), a) and at least a portion of b), optionally in the presence of a catalyst, to form a first prepolymer,
   ii) dissolving the first prepolymer in a solvent, optionally in combination with the remainder of component b) and/or component c),
   iii) optionally adding components A3) and A4) to form a second prepolymer and
   iv) converting the resulting prepolymer into an aqueous dispersion or solution by adding water.

17. A sizing agent for glass fibers containing the binder composition of claim 1 or 2.

18. An adhesive composition containing the binder composition of claim 1 or 2.

19. A coating composition containing the binder composition of claim 1 or 2.

20. Glass fibers sized with the sizing agent of claim 10.

* * * * *